United States Patent
Chen et al.

(10) Patent No.: US 9,219,537 B2
(45) Date of Patent: Dec. 22, 2015

(54) METHOD AND SYSTEM FOR TRANSMITTING INFORMATION IN RELAY COMMUNICATION NETWORK

(75) Inventors: Yu-Qin Chen, Guangdong (CN);
Cheng-Yan Feng, Guangdong (CN);
Jian-Quan Song, Guangdong (CN);
Song Guo, Guangdong (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 602 days.

(21) Appl. No.: 13/638,947

(22) PCT Filed: Feb. 11, 2011

(86) PCT No.: PCT/CN2011/070926
§ 371 (c)(1),
(2), (4) Date: Oct. 2, 2012

(87) PCT Pub. No.: WO2011/120358
PCT Pub. Date: Oct. 6, 2011

(65) Prior Publication Data
US 2013/0077557 A1    Mar. 28, 2013

(30) Foreign Application Priority Data

Apr. 2, 2010 (CN) .......................... 2010 1 0157487

(51) Int. Cl.
*H04B 7/15* (2006.01)
*H04W 24/02* (2009.01)
*H04W 76/02* (2009.01)
*H04W 84/04* (2009.01)

(52) U.S. Cl.
CPC ............... *H04B 7/15* (2013.01); *H04W 24/02* (2013.01); *H04W 76/022* (2013.01); *H04W 84/047* (2013.01)

(58) Field of Classification Search
None
See application file for complete search history.

(56) References Cited

U.S. PATENT DOCUMENTS

| 2002/0089958 A1* | 7/2002 | Feder et al. ................... 370/338 |
| 2003/0119481 A1* | 6/2003 | Haverinen et al. ............. 455/411 |
| 2004/0120294 A1* | 6/2004 | Yang et al. ..................... 370/338 |
| 2007/0011560 A1* | 1/2007 | Backman et al. .............. 714/758 |

(Continued)

FOREIGN PATENT DOCUMENTS

| CN | 101001194 A | 7/2007 |
| CN | 101257705 A | 9/2008 |
| CN | 101262269 A | 9/2008 |

OTHER PUBLICATIONS

3rd Generation Partnership Project; Technical Specification Group Radio Access Network; Evolved Universal Terrestrial Radio Access (E-UTRA); "Relay architectures for E-UTRA (LTE-Advanced)" (Release 9); 3GPP TR 36.806 V2.0.0 (Feb. 2010).

*Primary Examiner* — Ayaz Sheikh
*Assistant Examiner* — Faiyazkhan Ghafoerkhan
(74) *Attorney, Agent, or Firm* — Li & Cai Intellectual Property (USA) Office

(57) ABSTRACT

The disclosure discloses an information transmission method and system in a relay communication network, the method comprises: establishing a first tunnel and a second tunnel, wherein the first tunnel is a tunnel between an Access Service Network Gateway (ASN GW) and a Base Station (BS), the second tunnel is a tunnel between the BS and a Relay Station (RS); performing signaling and/or data transmission between the ASN GW and the RS through the first tunnel and the second tunnel. The invention implements the transmission of signaling and/or data in Layer3 relay.

22 Claims, 8 Drawing Sheets

(56) References Cited

U.S. PATENT DOCUMENTS

| | | | |
|---|---|---|---|
| 2007/0254663 A1* | 11/2007 | Fiat | 455/436 |
| 2008/0107061 A1* | 5/2008 | Tao et al. | 370/315 |
| 2008/0108326 A1* | 5/2008 | Park et al. | 455/411 |
| 2008/0281978 A1* | 11/2008 | Tang et al. | 709/232 |
| 2009/0016290 A1* | 1/2009 | Chion et al. | 370/329 |
| 2009/0323658 A1* | 12/2009 | Balasubramanian et al. | 370/338 |
| 2010/0002692 A1* | 1/2010 | Bims | 370/389 |
| 2010/0023609 A1* | 1/2010 | Vangala et al. | 709/221 |
| 2010/0067462 A1* | 3/2010 | Beser et al. | 370/329 |
| 2010/0111061 A1* | 5/2010 | Zheng et al. | 370/338 |
| 2010/0118774 A1* | 5/2010 | Gotthard et al. | 370/328 |
| 2010/0260129 A1* | 10/2010 | Ulupinar et al. | 370/329 |
| 2010/0272006 A1* | 10/2010 | Bertrand et al. | 370/315 |
| 2011/0069654 A1* | 3/2011 | Xu et al. | 370/315 |
| 2011/0134826 A1* | 6/2011 | Yang et al. | 370/315 |
| 2011/0243061 A1* | 10/2011 | Wang et al. | 370/315 |
| 2012/0324100 A1* | 12/2012 | Tomici et al. | 709/224 |

* cited by examiner

| IP Ver | IP HLEN | DSCP | IP datagram total length | |
|---|---|---|---|---|
| IP identifier | | | Mark | IP fragment offset |
| IP time to live | IP protocol | | | IP header checksum |
| Source IP address (for example, IP address of BS) | | | | |
| Destination IP address (for example, IP address of ASN-GW EP) | | | | |
| 0 | 1 1 | Preserved | Ver | GRE payload protocol type (may be IP or Ethernet) |
| GRE key | | | | |
| Sequence number | | | | |
| Starting point for encapsulating payload | | | | |

FIG. 2 (PRIOR ART)

METHOD AND SYSTEM FOR TRANSMITTING INFORMATION IN RELAY COMMUNICATION NETWORK

FIELD OF THE INVENTION

The disclosure relates to the field of communications, in particular to a method and system for transmitting information in a relay communication network.

BACKGROUND

FIG. 1 is a diagram of a wireless relay communication network architecture according to related technologies. As shown in FIG. 1, in a multi-hop radio relay system, one or more Relay Stations (RS) are arranged between a multi-hop relay Base Station (BS) and a Mobile Station (MS). The RS relays and transmits signals between the BS and the MS, in order to extend the coverage and increase the system capacity.

Based on the data forwarding mechanisms supported by RSs and the control capability of RSs on subordinate stations, RSs may be classified into Layer2 RS, which only supports air interface side function block, and Layer3 RS, which supports access network side function block. As the Layer2 RS only supports the two bottom-most layers (i.e., Physical (PHY) layer and Media Access Control (MAC) layer) in the network protocol architecture, the RS is directly or indirectly connected with the BS and controlled by the BS. For an Access Service Network Gateway (ASN GW), Layer2 RS does not exist. In contrast, in addition to PHY and MAC two layers, the Layer3 RS also supports an interface with the ASN GW, therefore, for the ASN GW, Layer3 RS is visible. In some standard protocols (for example, Institute for Electrical and Electronic Engineers (IEEE802.16m)), Layer3 RS is also called distributed control RS. As an evolved air interface standard based on IEEE802.16e System Profile Rel1.0, IEEE802.16m can provide complete backward compatibility for System Profile Rel1.0. To distinguish from the BS, RS, and MS in IEEE802.16e, the BS, RS, and MS in IEEE802.16m are called Advanced BS (ABS), Advanced RS (ARS) and Advanced MS (AMS).

The air interface addressing method in IEEE802.16m is different from that in IEEE802.16e. In IEEE802.16e, a Connection Identifier (CID) is used between the MS and the BS to identify a service flow; in IEEE802.16m, to reduce the overhead of the CID field in the Media Access Control Protocol Data Unit (MAC PDU), the CID is divided into two parts, respectively: the 12 bits Station Identifier (STID) and the 4 bits Flow Identifier (FID). During data transmission, the STID is carried in the resource indication evolved Advanced MAP (A-MAP) through Mask Cyclic Redundancy Code (MCRC), while the FID is carried in the MAC PDU.

In IEEE802.16e communication protocol, communication is performed between the BS and the ASN GW through R6 interface. In the R6 interface, the data plane transmission is encapsulated by means of Generic Routing Encapsulation (GRE). FIG. 2 is a diagram of a GRE encapsulation format based on Internet Protocol (IP) Convergence Sub-layer (CS) according to related technologies. As shown in FIG. 2, the GRE encapsulation format mainly contains the following fields:

Differentiated Service Code Point (DSCP), configured to indicate the Quality of Service (QoS) class of payload;

source/destination IP address, configured to indicate the endpoint of the GRE tunnel, for example, BS/ASN GW IP address;

GRE key, allocated by a specific node; usually, there is a one-to-one correspondence between the connection and the GRE key;

sequence number, configured to guarantee the synchronization and continuity of data transmission during the transmission process.

As shown in FIG. 2, GRE encapsulation format may further contain the following contents: IP Ver, IP HLEN, IP Datagram Total Length, IP Identification, IP Fragment Offset, IP Time to Live, IP Protocol, IP Header Checksum, GRE Payload Protocol Type or the like, which will not be described repeatedly herein.

FIG. 3 is a diagram of an access network data path based on IP CS according to related technologies. Specifically, FIG. 3 shows a function implementation method of a data path in an access network based on GRE encapsulation of IP CS. The BS and the ASN GW respectively perform mapping between the uplink and downlink connections and the GRE tunnel in IEEE802.16e, wherein, there is a one-to-one correspondence between the connection and the GRE key.

For Layer2 relay, during implementation, requirements on the functions of the RS are comparatively lower, but requirements on the functions of the BS are higher. Considering that signaling and data transmission methods completely different from those in traditional IEEE802.16e technology are required to be designed in the link (relay link) between the BS and the RS, therefore, during the product implementation, it is difficult to use existing software, and great difficulty is brought to the Interoperability Test (IOT). While for Layer3 relay, the RS is visible at the ASN GW, the RS may be directly controlled by the ASN GW. The BS plays a role of data and signaling forwarding between the RS and the ASN GW. In Layer3 relay, as functions of the RS and the BS are substantially similar, the only difference is that the function is weak or strong. Thus, the RS may use the existing software in the BS in IEEE802.16e repeatedly; no software has to be dedicatedly developed for the RS, so that the product development of the RS may be facilitated, and products may enter the market as soon as possible.

However, the information transmission method in the relay transmission network in the related technologies can not apply to the Layer3 RS, as a result, Layer3 relay transmission cannot be performed.

SUMMARY

The purpose of the disclosure is to provide a method and system for transmitting information in a relay communication network, to solve the above problem.

According to one aspect of the disclosure, a method for transmitting information in a relay communication network is provided, comprising: establishing a first tunnel and a second tunnel, wherein the first tunnel is a tunnel between an ASN GW and a BS, the second tunnel is a tunnel between the BS and a RS; performing signaling and/or data transmission between the ASN GW and the RS through the first tunnel and the second tunnel.

The step of performing signaling and/or data transmission between the ASN GW and the RS through the first tunnel and the second tunnel comprises: in a case that the transmission is a downlink transmission, the ASN GW sends downlink signaling and/or data to the BS through the first tunnel, and the BS forwards the downlink signaling and/or data to the RS through the second tunnel according to a mapping relationship; in a case that the transmission is an uplink transmission, the RS sends uplink signaling and/or data to the BS through the second tunnel, and the BS forwards the uplink signaling and/or data to the ASN GW through the first tunnel according to the mapping relationship; wherein, the mapping relationship is the mapping relationship between the first tunnel and the second tunnel.

In a case that the transmission is a data transmission, the first tunnel and the second tunnel are GRE tunnels.

In a case of uplink data transmission, the step of performing data transmission between the ASN GW and the RS through the first tunnel and the second tunnel comprises: the RS encapsulates the uplink data into a second GRE/IP encapsulated packet, further encapsulates the second GRE/IP encapsulated packet into a relay MAC PDU and sends the relay MAC PDU to the BS; the BS analyzes the relay MAC PDU to obtain the second GRE/IP encapsulated packet, identifies information of the first tunnel according to the mapping relationship and the information of the second tunnel obtained by analyzing the second GRE/IP encapsulated packet, re-encapsulates payload into a first GRE/IP encapsulated packet and sends the first GRE/IP encapsulated packet to the ASN GW through the first tunnel.

In a case of downlink data transmission, the step of performing data transmission between the ASN GW and the RS through the first tunnel and the second tunnel comprises: the ASN GW encapsulates the downlink data into a first GRE/IP encapsulated packet and sends the first GRE/IP encapsulated packet to the BS through the first tunnel; the BS identifies information of the second tunnel according to the mapping relationship and the information of the first tunnel obtained by analyzing the first GRE/IP encapsulated packet, re-encapsulates payload into a second GRE/IP encapsulated packet, further encapsulates the second GRE/IP encapsulated packet into a relay MAC PDU, and sends the relay MAC PDU to the RS.

In a case of downlink data transmission, after encapsulating the second GRE/IP encapsulated packet into a relay MAC PDU and sending the relay MAC PDU to the RS, the method further comprises: the RS analyzes the relay MAC PDU to obtain the second GRE/IP encapsulated packet, analyzes the second GRE/IP encapsulated packet to obtain the downlink data, encapsulates the downlink data into a MAC PDU, and sends the MAC PDU to a MS.

In a case of downlink data transmission, before encapsulating the second GRE/IP encapsulated packet into a relay MAC PDU and sending the relay MAC PDU to the RS, the method further comprises: the BS determines whether the destination MS of the downlink data is a MS governed by the BS or a MS under a RS governed by the BS, encapsulates the downlink data into a MAC PDU and sends the MAC PDU to the destination MS if the destination MS is a MS governed by the BS, and continues the subsequent processing if the destination MS is a MS under a RS governed by the BS.

One of the RS and the BS maps the relay MAC PDU to an air interface connection service flow with corresponding QoS class to send the relay MAC PDU to the other one, after re-encapsulating the second GRE/IP encapsulated packet into the relay MAC PDU.

The information of the first tunnel and the information of the second tunnel include a GER key.

In a case that the transmission is a signaling transmission, the first tunnel and the second tunnel are User Datagram Protocol (UDP)/IP tunnels.

In a case of uplink signaling transmission, the step of performing data transmission between the ASN GW and the RS through the first tunnel and the second tunnel comprises: the RS encapsulates the uplink signaling into a second UDP/IP encapsulated packet, further encapsulates the second UDP/IP encapsulated packet into a relay MAC PDU and sends the relay MAC PDU to the BS; the BS analyzes the relay MAC PDU to obtain the second UDP/IP encapsulated packet, identifies the information of the first tunnel according to the mapping relationship and the information of the second tunnel obtained by analyzing the second UDP/IP encapsulated packet, re-encapsulates payload into a first UDP/IP encapsulated packet and sends the first UDP/IP encapsulated packet to the ASN GW through the first tunnel.

In a case of downlink signaling transmission, the step of performing data transmission between the ASN GW and the RS through the first tunnel and the second tunnel comprises: the ASN GW encapsulates the downlink signaling into a first UDP/IP encapsulated packet and sends the first UDP/IP encapsulated packet to the BS through the first tunnel; the BS identifies the information of the second tunnel according to the mapping relationship and the information of the first tunnel obtained by analyzing the first UDP/IP encapsulated packet, re-encapsulates payload into a second UDP/IP encapsulated packet, further encapsulates the second UDP/IP encapsulated packet into a relay MAC PDU, and sends the relay MAC PDU to the RS.

In a case of downlink signaling transmission, after encapsulating the second UDP/IP encapsulated packet into a relay MAC PDU and sending the relay MAC PDU to the RS, the method further comprises: the RS analyzes the relay MAC PDU to obtain the second UDP/IP encapsulated packet, analyzes the second UDP/IP encapsulated packet to obtain the downlink signaling, generates the downlink signaling in an air interface side message format, encapsulates the downlink signaling in the air interface side message format into a MAC PDU, and sends the MAC PDU to a MS.

One of the RS and the BS maps the relay MAC PDU to an air interface connection service flow with corresponding QoS class to send the relay MAC PDU to the other one, after re-encapsulating the second UDP/IP encapsulated packet into the relay MAC PDU.

The GRE/IP encapsulated packet and/or the UDP/IP encapsulated packet are encapsulated packets processed by compression, wherein the compression includes header compression.

In a case of GRE/IP encapsulated packet, the header compression includes one of the following ways: completely compressing static parameters according to a compression protocol, reserving the GRE key of a GRE part, and compressing the bytes used by a sequence number field; using a compression protocol adapted to dynamic parameter compression to compress a GRE/IP encapsulated header; abandoning the IP header in a GRE/IP encapsulated header, and compressing the GRE header in a GRE/IP encapsulated header.

In a case of downlink data transmission, the step of establishing the first tunnel and the second tunnel comprises: the ASN GW establishes the first tunnel, and the BS establishes the second tunnel; in a case of uplink data transmission, the step of establishing the first tunnel and the second tunnel comprises: the BS establishes the first tunnel, and the RS establishes the second tunnel.

The second tunnel is a multi-section tunnel from the BS to the RS through one or more intermediate RSs.

The step of performing signaling and/or data transmission between the ASN GW and the RS through the first tunnel and the second tunnel comprises: performing signaling and/or data transmission between the ASN GW and the BS through the first tunnel; according to the mapping relationship between adjacent tunnels in the multi-section tunnel, performing signaling and/or data transmission from the BS to the RS via one or more intermediate RSs through the second tunnel.

The step of performing downlink signaling and/or data transmission between the ASN GW and the RS through the first tunnel and the second tunnel comprises: the ASN GW sends downlink signaling and/or data to the BS through the first tunnel; the BS addresses according to a Station Identifier (STID) of the RS, and the intermediate RS forwards the downlink signaling and/or data in a case of determining that the RS is a subordinate RS of the intermediate RS according to the STID, until the downlink signaling and/or data reaches the RS.

According to another aspect of the disclosure, a method for transmitting information in a relay communication network is provided, comprising: establishing a first tunnel, wherein the first tunnel is a tunnel between an ASN GW and a BS; performing signaling transmission between the ASN GW and the BS through the first tunnel, and performing signaling transmission between the BS and a RS through an air interface.

In a case of uplink signaling transmission, the step of performing signaling transmission between the BS and a RS through an air interface comprises: the RS bears the uplink signaling in an air interface side message and sends the air interface side message to the BS, wherein the uplink signaling includes one of the following messages: R6 interface message generated from a signaling message from a MS, and R6 interface message generated by the RS; the step of performing signaling transmission between the ASN GW and the BS through the first tunnel comprises: the BS encapsulates the uplink signaling analyzed from the air interface side message into a UDP/IP encapsulated packet and sends the UDP/IP encapsulated packet to the ASN GW.

In a case of downlink signaling transmission, the step of performing signaling transmission between the ASN GW and the BS through the first tunnel comprises: the ASN GW encapsulates the downlink signaling into a UDP/IP encapsulated packet and sends the UDP/IP encapsulated packet to the BS through the first tunnel; the step of performing signaling transmission between the BS and a RS through an air interface comprises: the BS analyzes the UDP/IP encapsulated packet to obtain the downlink signaling, bears payload in an air interface side message, and sends the air interface side message to the RS.

One of the RS and the BS maps the air interface side message to an air interface connection service flow with corresponding QoS class to send the air interface side message to the other one.

The signaling transmission is performed between the BS and the RS via one or more intermediate RSs through the air interface.

According to still another aspect of the disclosure, a system for transmitting information in a relay communication network is provided, comprising: an ASN GW, configured to establish a first tunnel and send signaling and/or data to a BS through the first tunnel, wherein the first tunnel is a tunnel between the ASN GW and the BS; a BS, configured to establish a second tunnel and send the signaling and/or data to the RS through the second tunnel, wherein the second tunnel is a tunnel between the BS and the RS; a RS, configured to receive the signaling and/or data from the BS through the second tunnel.

According to yet another aspect of the disclosure, a system for transmitting information in a relay communication network is provided, comprising: a RS, configured to establish a second tunnel and send signaling and/or data to a BS through the second tunnel, wherein the second tunnel is a tunnel between the BS and the RS; a BS, configured to establish a first tunnel and send the signaling and/or data to an ASN GW through the first tunnel, wherein the first tunnel is a tunnel between the ASN GW and the BS; an ASN GW, configured to receive the signaling and/or data from the BS through the first tunnel.

Through the disclosure, by respectively establishing transmission tunnels between the ASN GW and the BS and between the BS and the RS, information transmission is performed between the ASN GW and the RS through the established tunnels, the problem that Layer3 relay transmission cannot be performed in the related technologies is solved, and transmission of signaling and/or data in Layer3 relay is implemented.

BRIEF DESCRIPTION OF THE DRAWINGS

Drawings described herein are provided for further standing of the disclosure and form one part of the application, exemplary embodiments of the disclosure and descriptions thereof are used for explaining the disclosure and form no improper limit to the disclosure. In the drawings:

FIG. 2 is a diagram of a GRE encapsulation format based on IP CS according to related technologies;

DETAILED DESCRIPTION

The disclosure will be described in details below with reference to drawings and in conjunction with embodiments. It should be noted that embodiments in the application and features in the embodiments may be combined if not conflicted.

Figure 1:
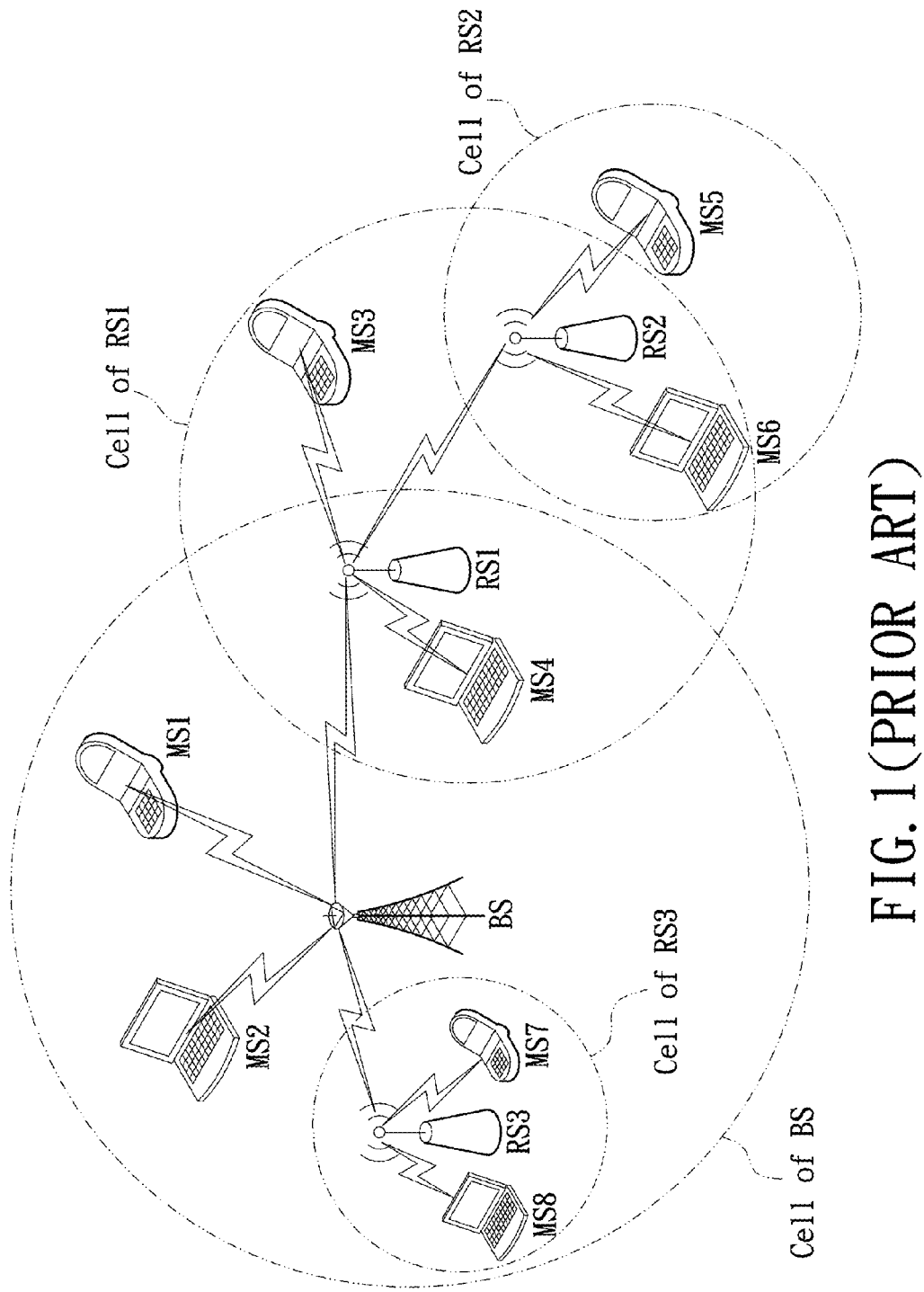
FIG. 1 is a diagram of a radio relay communication network architecture according to related technologies.
Figure 3:
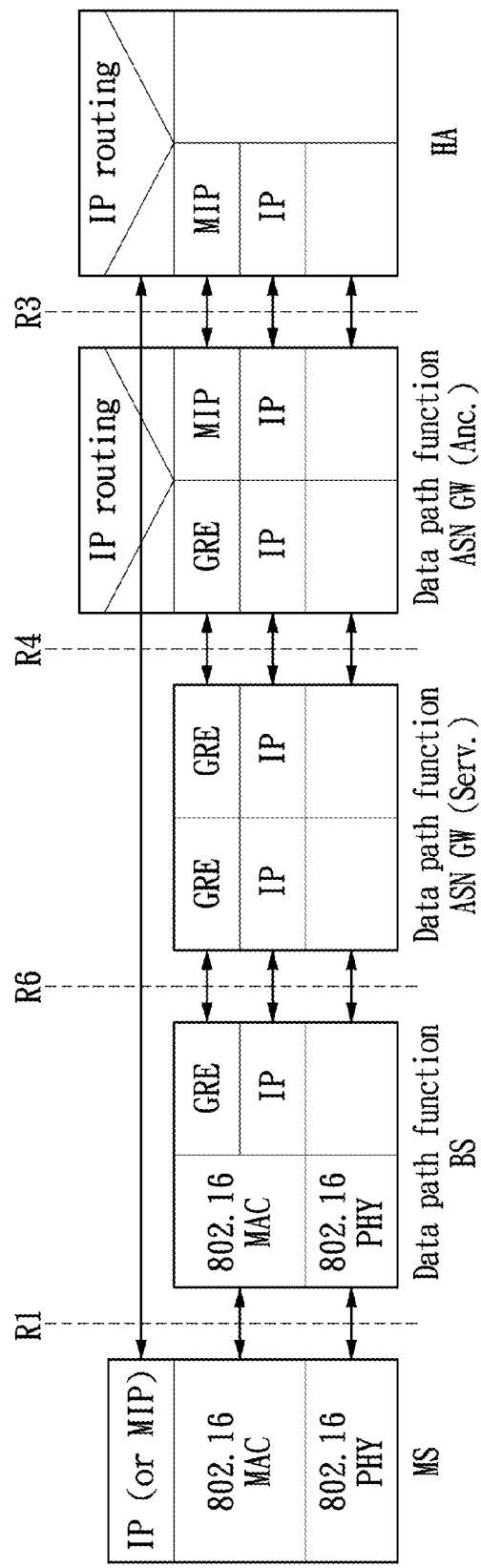
FIG. 3 is a diagram of an access network data path based on IP CS according to related technologies.
Figure 4:
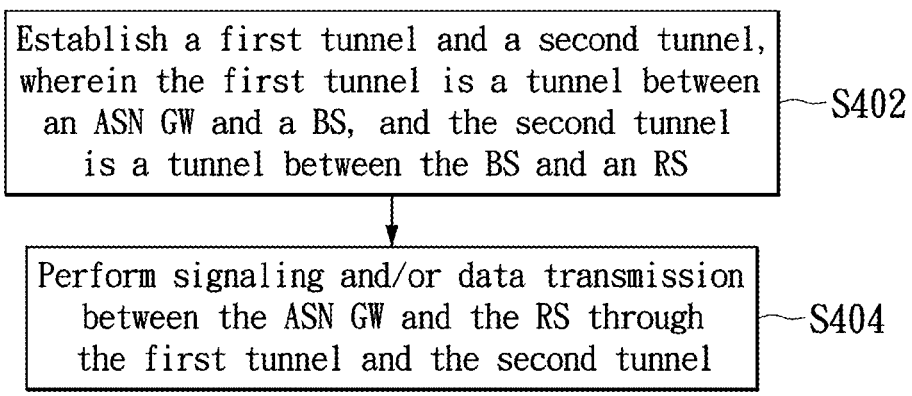
FIG. 4 is a flow chart of a method for transmitting information in a relay communication network according to embodiments of the disclosure.

The embodiment of the disclosure provides an information transmission method in a relay communication network, FIG. 4 is a flow chart of an information transmission method in a relay communication network according to embodiments of the disclosure, as shown in FIG. 4, the method comprises:

S402: A first tunnel and a second tunnel are established, wherein the first tunnel is a tunnel between an ASN GW and a BS, and the second tunnel is a tunnel between the BS and a RS.

S404: Signaling and/or data transmission between the ASN GW and the RS is performed through the first tunnel and the second tunnel.

The method described above may be applied in a case that the RS is a Layer3 RS, a flow of signaling and/or data transmission in a relay communication network is provided, Layer3 relay may be implemented through this flow. It should be noted that, the BS, RS and MS described above respectively include the BS, RS and MS in IEEE802.16e and the ABS, ARS and AMS in IEEE802.16m.

Preferably, in a case of downlink data transmission, S402 may comprise: the ASN GW establishes the first tunnel, and the BS establishes the second tunnel; in a case of uplink data transmission, S402 may comprise: the BS establishes the first tunnel, and the RS establishes the second tunnel.

Specifically, the first tunnel may be a wired bearer, and the second tunnel may be a radio bearer.

Preferably, the step of performing signaling and/or data transmission between the ASN GW and the RS through the first tunnel and the second tunnel comprises:

1. in a case of downlink transmission, the ASN GW sends downlink signaling and/or data to the BS through the first tunnel, and the BS forwards the downlink signaling and/or data to the RS through the second tunnel according to the mapping relationship;

2. in a case of uplink transmission, the RS sends uplink signaling and/or data to the BS through the second tunnel, and the BS forwards the uplink signaling and/or data to the ASN GW through the first tunnel according to the mapping relationship.

The above mapping relationship is the mapping relationship between the first tunnel and the second tunnel.

Preferably, in a case of data transmission, the first tunnel and the second tunnel are GRE tunnels; in a case of signaling transmission, the first tunnel and the second tunnel are UDP/IP tunnels.

The specific processing process of S404 in cases of uplink signaling and/or data transmission and downlink signaling and/or data transmission will be described below, respectively.

(1) Data Transmission

In a case of data transmission, the first tunnel and the second tunnel are GRE tunnels, and the information of the first tunnel and the information of the second tunnel may be but not limited to GRE key. According to the granularity, the established GRE tunnels may include: GRE tunnel established for each service flow of the MS; or, GRE tunnel established for each AMS; or, GRE tunnel established for each ARS. There is a mapping relationship between the first tunnel and the second tunnel, information of this mapping relationship is stored in the BS. It should be noted that, the mapping relationship may be or not be a one-to-one relationship.

Uplink Data Transmission

For uplink data transmission, S404 may comprise:

S4041: The RS encapsulates the uplink data into a second GRE/IP encapsulated packet, and further encapsulates the second GRE/IP encapsulated packet into a relay MAC PDU and sends the relay MAC PDU to the BS.

S4042: The BS analyzes the relay MAC PDU to obtain the second GRE/IP encapsulated packet, identifies information of the first tunnel according to the mapping relationship and the information of the second tunnel obtained by analyzing the second GRE/IP encapsulated packet, re-encapsulates payload into a first GRE/IP encapsulated packet and sends the first GRE/IP encapsulated packet to the ASN GW through the first tunnel.

Preferably, the step of further encapsulating the second GRE/IP encapsulated packet into a relay MAC PDU and sends the relay MAC PDU to the BS through the second tunnel may comprise: the RS maps the relay MAC PDU to an air interface connection service flow with corresponding QoS class to send the relay MAC PDU to the BS, after re-encapsulating the second GRE/IP encapsulated packet into the relay MAC PDU.

During the practical application, the uplink data transmission may be performed in the following specific steps:

Step 1: The RS receives a MAC PDU from the MS, analyzes the received MAC PDU, encapsulates payload into a GRE/IP packet (i.e., the second GRE/IP encapsulated packet), processes the GRE/IP packet, encapsulates the GRE/IP packet into a relay MAC PDU, and sends the relay MAC PDU to the BS; preferably, the GRE/IP packet carries information of the second tunnel.

Step 2: The BS analyzes the received relay MAC PDU and further analyzes the GRE/IP encapsulated data to obtain the GRE key information, the BS obtains the GRE key corresponding to the GRE tunnel (i.e., the first tunnel) between the BS and the ASN GW from the stored GRE tunnel mapping relationship, and re-encapsulates the payload of the received GRE/IP encapsulated packet (i.e., the second GRE/IP encapsulated packet) and the GRE key corresponding to the second tunnel into a GRE/IP encapsulated packet (i.e., the first GRE/IP encapsulated packet).

Step 3: The BS sends the encapsulated GRE/IP encapsulated packet (i.e., the first GRE/IP encapsulated packet) to the ASN GW through the first tunnel.

Preferably, the process that the RS encapsulates the GRE/IP packet into a relay MAC PDU and sends the relay MAC PDU to the BS specifically comprises: one or more air interface connection service flows with different QoS classes are established between the RS and the BS; when the RS maps the GRE encapsulated data to the air interface connection service flow, it sends the GRE tunnel data with different QoS classes (i.e., GRE/IP encapsulated data with different DSCP values, processed by header compression) to the BS through the corresponding air interface connection service flow. Further, the GRE tunnel between the RS and the BS and the air interface bearer (i.e., relay air interface) connection service flow may have a one-to-one correspondence or several-to-one relationship; that is, there is a one-to-one correspondence or several-to-one mapping relationship between the service flow of the MS and the relay air interface connection service flow. Further, the QoS class of the GRE tunnel is indicated by the DSCP value.

Specifically, the header compression processing way may include one of the following ways: completely compressing static parameters according to a compression protocol, reserving the GRE key of a GRE part, and compressing the bytes used by a sequence number field; using a compression protocol adapted to dynamic parameter compression to compress a GRE/IP encapsulated header; abandoning the IP header in a GRE/IP encapsulated header, and compressing the GRE header in a GRE/IP encapsulated header.

Downlink Data Transmission

For downlink data transmission, S404 may comprise:

S4043: The ASN GW encapsulates the downlink data into a first GRE/IP encapsulated packet and sends the first GRE/IP encapsulated packet to the BS through the first tunnel.

S4044: The BS identifies information of the second tunnel according to the mapping relationship and the information of the first tunnel obtained by analyzing the first GRE/IP encapsulated packet, re-encapsulates payload into a second GRE/IP encapsulated packet, further encapsulates the second GRE/IP encapsulated packet into a relay MAC PDU, and sends the relay MAC PDU to the RS.

After encapsulating the second GRE/IP encapsulated packet into a relay MAC PDU and sending the relay MAC PDU to the RS through the second tunnel, S404 further comprises: the RS analyzes the relay MAC PDU to obtain the second GRE/IP encapsulated packet, analyzes the second GRE/IP encapsulated packet to obtain the downlink data, encapsulates the downlink data into a MAC PDU, and sends the MAC PDU to a MS.

Before encapsulating the second GRE/IP encapsulated packet into a relay MAC PDU and sending the relay MAC PDU to the RS, S404 may further comprise: the BS determines whether the destination MS of the downlink data is a MS governed by the BS or a MS under a RS governed by the BS, encapsulates the downlink data into a MAC PDU and sends the MAC PDU to the destination MS if the destination MS is a MS governed by the BS, and continues the subsequent processing if the destination MS is a MS under a RS governed by the BS.

Preferably, the step of further encapsulating the second GRE/IP encapsulated packet into a relay MAC PDU and sends the relay MAC PDU to the RS through the second tunnel may comprise: the BS maps the relay MAC PDU to an air interface connection service flow with corresponding QoS class to send the relay MAC PDU to the RS, after re-encapsulating the second GRE/IP encapsulated packet into the relay MAC PDU.

During the practical application, the downlink data transmission may be performed in the following specific steps:

Step 1: The ASN GW receives data from an external node, encapsulates the data by means of GRE/IP, and sends the GRE/IP encapsulated data to the BS through the first tunnel.

Step 2: The BS analyzes the received GRE/IP encapsulated data to obtain the GRE key information (this information may be obtained from the GRE/IP header), obtains the GRE key corresponding to the GRE tunnel (i.e., the second tunnel) between the BS and the RS from the stored GRE tunnel mapping relationship, and re-encapsulates the payload of the received GRE/IP encapsulated packet (i.e., the first GRE/IP encapsulated packet) and the GRE key corresponding to the second tunnel into a corresponding GRE/IP encapsulated packet.

Step 3: The BS sends the encapsulated GRE/IP encapsulated packet (i.e., the second GRE/IP encapsulated packet) to the RS through the second tunnel in relay MAC PDU format. Preferably, the BS may send the re-encapsulated data to the RS on the relay connection in relay MAC PDU format, the relay connection may be identified by relay CID, tunnel CID, relay FID or the like.

Step 4: After receiving the relay MAC PDU, the RS analyzes the relay MAC PDU to obtain the GRE/IP encapsulated packet (i.e., the second GRE/IP encapsulated packet), analyzes the GRE/IP encapsulated packet to obtain the corresponding data (i.e., payload of the GRE/IP encapsulated packet), encapsulates the data into a MAC PDU and sends the MAC PDU to the MS.

Preferably, during the process that the ASN GW sends the GRE/IP encapsulated packet to the BS, the ASN GW encapsulates the data subordinate to MSs governed by the BS (including MSs subordinate to RSs governed by the BS) in the received data into a GRE/IP packet and sends the GRE/IP packet to the BS. After receiving the data, the BS analyzes the GRE/IP encapsulated packet, encapsulates the data subordinate to MSs governed by RSs into a GRE/IP packet and sends the GRE/IP packet to the RS in relay MAC PDU format; it does not encapsulate the data subordinate to MSs in GRE/IP, instead, it sends the data to the MS in MAC PDU format. That is, before encapsulating the information of the second tunnel and the downlink data into a second GRE/IP encapsulated packet, the BS may first determine whether the destination MS of the downlink data is a MS governed by the BS or a MS under a RS governed by the BS, it encapsulates the downlink data into a MAC PDU and sends the MAC PDU to the destination MS if the destination MS is a MS under a RS governed by the BS, and continues the subsequent processing if the destination MS is a MS governed by the BS.

Preferably, the process that the BS sends the encapsulated GRE/IP data to the RS through the second tunnel in relay MAC PDU format comprises: establishing one or more air interface connection service flows with different QoS classes between the BS and the RS; when the BS maps the GRE encapsulated data to the air interface connection service flow, it sends the GRE encapsulated data with different QoS classes (i.e., GRE/IP encapsulated data with different DSCP values, processed by header compression) to the RS through the corresponding air interface connection service flow. Further, the correspondence between the GRE tunnel between the BS and the RS and the air interface bearer (i.e., relay air interface) connection service flow may be one-to-one correspondence or several-to-one relationship; that is, there is a one-to-one correspondence or several-to-one mapping relationship between the service flow of the MS and the service flow of the RS. Further, the QoS class of the GRE tunnel is indicated by the DSCP value.

Specifically, the header compression process performed on the second GRE/IP encapsulated packet may include but not limited to one of the following ways: completely compressing static parameters according to a compression protocol, reserving the GRE key of a GRE part, and compressing the bytes used by a sequence number field; using a compression protocol adapted to dynamic parameter compression to compress a GRE/IP encapsulated header; abandoning the IP header in a GRE/IP encapsulated header, and compressing the GRE header in a GRE/IP encapsulated header.

(2) Signaling Transmission

In a case of signaling transmission, the first tunnel and the second tunnel are UDP/IP tunnels, the first tunnel between the ASN GW and the BS and the second tunnel between the BS and the RS may have a one-to-one mapping relationship, and this mapping relationship is stored in the BS.

Uplink Signaling Transmission

For uplink signaling transmission, S404 may comprise:

S4045: The RS encapsulates the uplink signaling into a second UDP/IP encapsulated packet, and further encapsulates the second UDP/IP encapsulated packet into a relay MAC PDU and sends the relay MAC PDU to the BS through the second tunnel.

S4046: The BS analyzes the relay MAC PDU to obtain the second UDP/IP encapsulated packet, identifies information of the first tunnel according to the mapping relationship and the information of the second tunnel obtained by analyzing the second UDP/IP encapsulated packet, re-encapsulates payload into a first UDP/IP encapsulated packet and sends the first UDP/IP encapsulated packet to the ASN GW through the first tunnel.

Preferably, the step of further encapsulating the second UDP/IP encapsulated packet into a relay MAC PDU and sends the relay MAC PDU to the BS through the second tunnel may comprise: the RS maps the relay MAC PDU to an air interface connection service flow with corresponding QoS class to send the relay MAC PDU to the BS, after re-encapsulating the second UDP/IP encapsulated packet into the relay MAC PDU.

During the practical application, the uplink signaling transmission may be performed in the following specific steps:

Step 1: The RS encapsulates the R6 message and the information of the second tunnel in UDP/IP (to obtain the second UDP/IP encapsulated packet), and sends the UDP/IP packet to the BS through the second tunnel in relay MAC PDU format, specifically, it sends the UDP/IP packet to the BS through the second tunnel on the air interface management connection. Preferably, the information of the second tunnel may be encapsulated in the header of the UDP/IP encapsulated packet, and the second UDP/IP encapsulated packet may be an encapsulated packet that is processed specially, for example, processed with header compression including Payload Header Suppression (PHS) or Robust Header Compression (ROHC) or the like.

Step 2: After receiving the relay MAC PDU from the RS, the BS analyzes the relay MAC PDU, further analyzes the UDP/IP encapsulated header of the signaling to obtain the information of the second tunnel, obtains the information of the first tunnel according to the stored mapping relationship between two sections of tunnels, and encapsulates the payload and the information of the first tunnel into a UDP/IP packet (i.e., the first UDP/IP encapsulated packet).

Step 3: The BS sends the encapsulated UDP/IP packet (i.e., the first UDP/IP encapsulated packet) to the ASN GW. Preferably, the first UDP/IP encapsulated packet may be processed with header compression.

Preferably, in Step 1, the process that the RS sends the UDP/IP encapsulated packet to the BS in relay MAC PDU format comprises:

Step 11: Establishing one or more air interface management connection service flows with different QoS classes for signaling transmission between the RS and the BS.

Step 12: Sending from the RS the UDP/IP encapsulated packets with different QoS classes to the BS through the corresponding air interface management connections when the RS maps UDP/IP encapsulated packets to the air interface management connection.

Specifically, the correspondence between UDP/IP tunnel between the RS and the BS and the air interface bearer (i.e., air interface management connection) may have a one-to-one correspondence or several-to-one relationship.

Downlink Signaling Transmission

For downlink signaling transmission, S404 may comprise:

S4047: The ASN GW encapsulates the downlink signaling into a first UDP/IP encapsulated packet and sends the first UDP/IP encapsulated packet to the BS through the first tunnel.

S4048: The BS identifies information of the second tunnel according to the mapping relationship and the information of the first tunnel obtained by analyzing the first UDP/IP encapsulated packet, re-encapsulates payload into a second UDP/IP encapsulated packet, further encapsulates the second UDP/IP encapsulated packet into a relay MAC PDU, and sends the relay MAC PDU to the RS.

Preferably, after encapsulating the second UDP/IP encapsulated packet into a relay MAC PDU and sending the relay MAC PDU to the RS, the method further comprises: the RS analyzes the relay MAC PDU to obtain the second UDP/IP encapsulated packet, analyzes the second UDP/IP encapsulated packet to obtain the downlink signaling, generates the downlink signaling in an air interface side message format, encapsulates the downlink signaling in the air interface side message format into a MAC PDU, and sends the MAC PDU to a MS.

Preferably, the step of further encapsulating the second UDP/IP encapsulated packet into a relay MAC PDU and sending the relay MAC PDU to the RS through the second tunnel may comprise: the BS maps the relay MAC PDU to an air interface management connection service flow with corresponding QoS class to send the relay MAC PDU to the RS, after re-encapsulating the second UDP/IP encapsulated packet into the relay MAC PDU.

During the practical application, the downlink signaling transmission may be performed through the following specific steps:

Step 1: The ASN GW encapsulates the signaling message and the information of the first tunnel into a UDP/IP encapsulated packet (i.e., the first UDP/IP encapsulated packet), and sends the UDP/IP encapsulated packet to the BS. Specifically, the information of the first tunnel may be the encapsulated header of the UDP/IP encapsulated packet.

Step 2: The BS receives the UDP/IP encapsulated packet from the ASN GW, obtains the information of the UDP/IP tunnel (i.e., the information of the first tunnel), and obtains the information of the second tunnel according to the stored mapping relationship between two sections of tunnels, and encapsulates the payload and the information of the second tunnel into a UDP/IP packet (i.e., the first UDP/IP encapsulated packet), and sends the UDP/IP packet to the RS in relay MAC PDU format. Specifically, it may send the UDP/IP packet to the RS through the second tunnel on the air interface management connection. Preferably, the second UDP/IP encapsulated packet may be processed with compression, for example, processed with header compression including PHS or ROHC or the like.

Step 3: After receiving the relay MAC PDU, the RS analyzes the relay MAC PDU to obtain the second UDP/IP encapsulated packet, analyzes the UDP/IP encapsulated packet to obtain the downlink signaling message (it may be a R6 message), generates the downlink signaling message in the air interface side message format and encapsulates it into a MAC PDU, and sends the MAC PDU to the MS.

Preferably, in Step 2, the step that the BS sends the UDP/IP encapsulated packet to the RS in relay MAC PDU format comprises: establishing one or more air interface management connection service flows with different QoS classes for signaling transmission between the BS and the RS; when the BS maps UDP/IP encapsulated packets to the air interface management connection, it sends UDP/IP encapsulated packets with different QoS classes to the RS through the corresponding air interface management connections. Further, the correspondence between the UDP/IP tunnel between the BS and the RS and the air interface bearer (i.e., air interface management connection) may have a one-to-one correspondence or several-to-one relationship.

In the abovementioned (1) data transmission and (2) signaling transmission, GRE/IP encapsulated packets (including the first GRE/IP encapsulated packet and the second GRE/IP encapsulated packet) and/or UDP/IP encapsulated packets (including the first UDP/IP encapsulated packet and the second UDP/IP encapsulated packet) are encapsulated packets processed with compression, specifically, such compression processing may be header compression, but not limited hereto. In a case of GRE/IP encapsulated packet, the header compression may adopt one of the following ways: completely compressing static parameters according to a compression protocol, reserving the GRE key of a GRE part, and compressing the bytes used by a sequence number field; using a compression protocol adapted to dynamic parameter compression to compress a GRE/IP encapsulated header; abandoning the IP header in a GRE/IP encapsulated header, and compressing the GRE header in a GRE/IP encapsulated header.

Processes of both (1) data transmission and (2) signaling transmission are based on a two-hop relay network scenario: ASN GW->BS->RS (destination RS, i.e., the final RS for transmission), for a case that there is one or more intermediate RSs between the BS and the RS (that is, a multi-hop relay network, data forwarding is performed between the BS and the MS through a plurality of (more than one) RSs), the above method is still applicable, and the method for transmitting information between the ASN GW and the BS is the same as that in a two-hop relay network.

At this time, the second tunnel may be understood as a multi-section tunnel from the BS to the RS via one or more intermediate RSs. Similar to a two-hop relay communication network, a GRE/IP or UDP/IP tunnel is established between two adjacent nodes (BS, RS), the source IP address and the destination IP address are nodes at the two ends of the tunnel. The service flow of the MS is bore on different tunnels and identified with the information of the tunnels. In terms of air interface transmission, the relay service flow may be established between two adjacent nodes, and also may be established between the BS and the destination RS. According to different service flow establishment methods, the specific transmission processes are slightly different.

In a case that the relay service flow is established between two adjacent nodes, the service flow of the MS and the relay service flow have a correspondence in accordance with the service flow QoS parameter, that is, the GRE tunnel and the relay service flow have a correspondence in accordance with the service flow QoS parameter. Furthermore, a certain node has a mapping relationship with the GRE tunnel between a parent node and a child node.

In a case that the relay service flow is established between the BS and the destination RS, the service flow of the MS and the relay service flow have a correspondence in accordance with the service flow QoS parameter, that is, each section of GRE tunnel and the relay service flow have a correspondence in accordance with the service flow QoS parameter. Furthermore, a certain node has a mapping relationship with the GRE tunnel between the parent nodes and the GRE tunnel between the child nodes.

Specifically, the above mentioned relay service flow may address in combination of the STID of the RS and the service flow connection FID.

S404 may specifically comprise:

Step 1: Signaling and/or data transmission is performed between the ASN GW and the BS through the first tunnel; this step is substantially the same as the foregoing step. The only difference is that the mapping relationship is the mapping relationship between the first tunnel and the first section of tunnel in the second tunnel, and the intermediate RS and the destination RS are actually RSs, therefore the adopted transmission means and the format of packets to be transmitted are the same.

Step 2: Signaling and/or data transmission through the second tunnel is performed from the BS to the destination RS via one or more intermediate RSs according to the mapping relationship between adjacent tunnels in the multi-section tunnel.

It should be noted that, in a case of downlink transmission, the order Step 1->Step 2 is followed; in a case of uplink transmission, the order Step 2->Step 1 is followed.

In a case of downlink data and/or signaling transmission, S404 may specifically comprise:

Step 1: The ASN GW sends downlink data and/or signaling to the BS through the first tunnel, this step is substantially identical to the foregoing step.

Step 2: The BS addresses according to the STID of the RS, and the intermediate RS forwards the downlink signaling and/or data in a case of determining that the RS is a subordinate RS of the intermediate RS according to the STID, until the downlink signaling and/or data reaches the RS.

Figure 12:
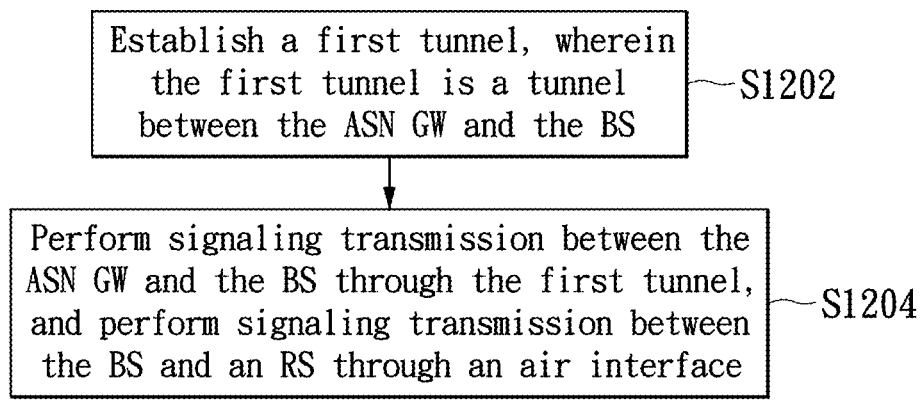
FIG. 12 is a flow chart of a method for transmitting information in a relay communication network according to embodiments of the disclosure.

The embodiments of the disclosure further provide a method for transmitting information in a relay communication network. Please refer to FIG. 12, which shows a flow chart of a method for transmitting information in a relay communication network in accordance with embodiments of the disclosure. The method comprises:

S1202: A first tunnel is established, wherein the first tunnel is a tunnel between the ASN GW and the BS.

S1204: Signaling transmission is performed between the ASN GW and the BS through the first tunnel, and signaling transmission is performed between the BS and a RS through an air interface.

In a case of uplink signaling transmission, S1204 may comprise: the RS bears the uplink signaling in an air interface side message and sends the air interface side message to the BS, wherein the uplink signaling includes one of the following messages: R6 interface message generated from a signaling message from a MS, and R6 interface message generated by the RS; the BS encapsulates the uplink signaling analyzed from the air interface side message into a UDP/IP encapsulated packet and sends the UDP/IP encapsulated packet to the ASN GW.

During the practical application, the uplink signaling transmission process in the embodiment may comprise the following steps:

Step 1: The RS bears uplink signaling (or called signaling message) of the R6 interface on an air interface side message and sends the air interface side message to the BS, wherein the uplink signaling of the R6 interface includes one of the following messages: R6 interface message generated from a signaling message from a MS, and R6 interface message generated by the RS. Specifically, The RS may map the air interface side message to the service flow with the corresponding QoS class to send the air interface side message to the BS.

Step 2: The BS encapsulates the uplink signaling (payload of the air interface side message) analyzed from the air interface side message into a UDP/IP encapsulated packet and sends the UDP/IP encapsulated packet to the ASN GW.

In a case of downlink signaling transmission, S1204 may comprise: the ASN GW encapsulates the downlink signaling into a UDP/IP encapsulated packet and sends the UDP/IP encapsulated packet to the BS through the first tunnel; the BS analyzes the UDP/IP encapsulated packet to obtain the downlink signaling, bears the payload on the air interface side message, and sends the air interface side message to the RS.

During the practical application, the downlink signaling transmission process in the embodiment may comprise the following steps:

Step 1: The ASN GW encapsulates downlink signaling (or called signaling message) of the R6 interface into a UDP/IP encapsulated packet and sends the UDP/IP encapsulated packet to the BS.

Step 2: The BS analyzes the UDP/IP encapsulated packet to obtain the downlink signaling (UDP/IP encapsulated payload), bears the downlink signaling on an air interface side message (that is, encapsulates the downlink signaling in air interface side message format) and sends the air interface side message to the RS. Specifically, the BS may map the air interface side message to the service flow with the corresponding QoS class to send the air interface side message to the RS.

Correspondingly, the method in the embodiment may also be applicable to multi-hop relay, that is, signaling transmission is performed between the BS and the RS through an air interface via one or more intermediate RSs.

Figure 5:
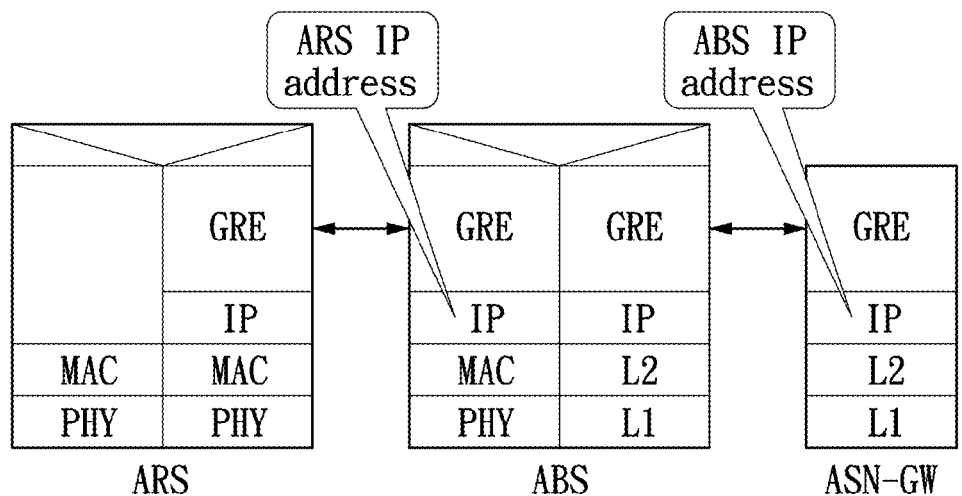
FIG. 5 is a diagram of a data plane protocol stack architecture of a Layer3 RS according to embodiments of the disclosure.
Figure 6:
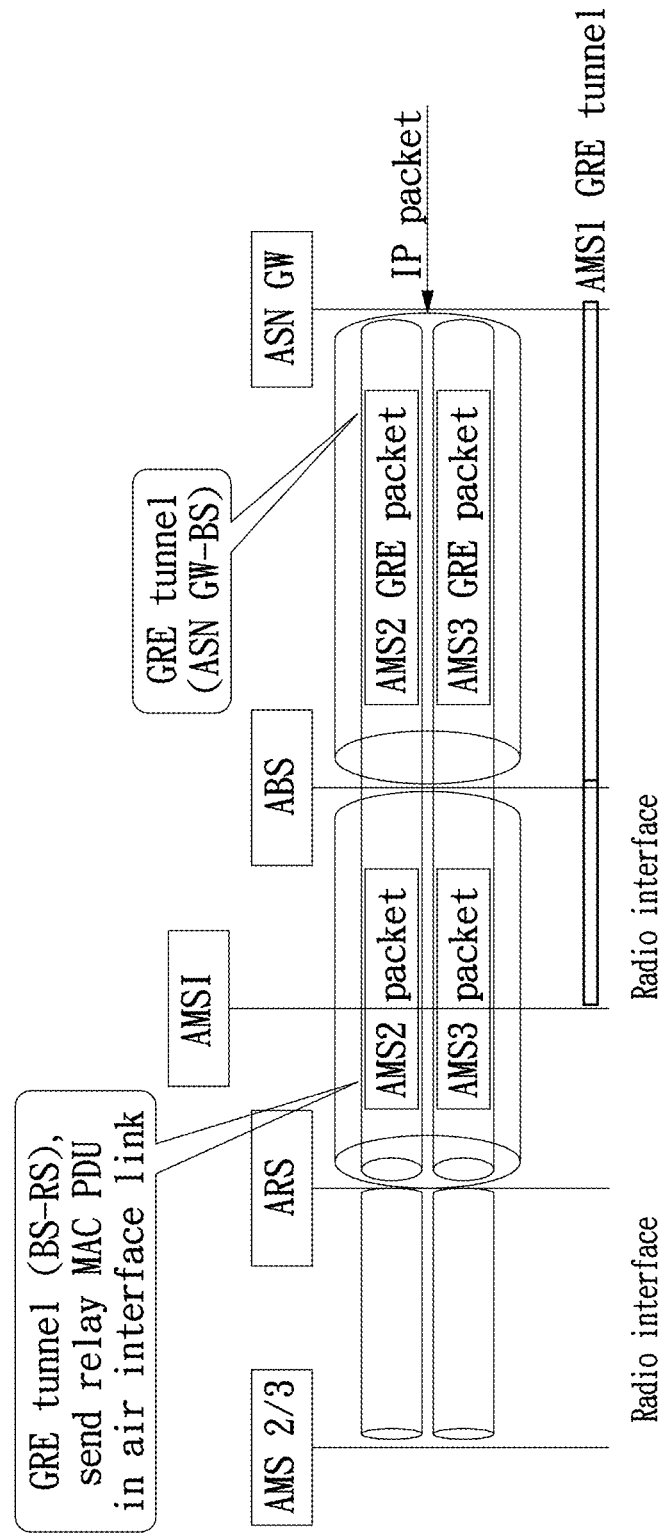
FIG. 6 is a diagram of data transmission in a Layer3 relay network according to embodiments of the disclosure.
Figure 7:
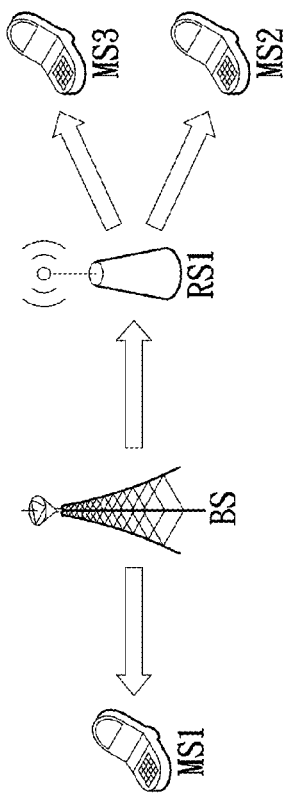
FIG. 7 is a network topology structure diagram of data transmission in a Layer3 relay network according to embodiments of the disclosure.

FIG. 5 is a diagram of a data plane protocol stack architecture of a Layer3 RS according to embodiments of the disclosure, FIG. 6 is a diagram of data transmission in a Layer3 relay network according to embodiments of the disclosure, and FIG. 7 is a network topology structure diagram of data transmission in a Layer3 relay network according to embodiments of the disclosure. The implementation process of the disclosure will be described in details below with reference to FIG. 5 to FIG. 7.

Embodiment 1

In a case of downlink data transmission, the basic flow of data transmission in a relay communication network comprises:

Step 1: The ASN GW establishes a GRE tunnel between the ASN GW and the ABS, and the addresses of the two ends of this GRE tunnel are respectively IP addresses of the ASN GW and the ABS; the ABS establishes a GRE tunnel between the ABS and the ARS, and the addresses of the two ends of this GRE tunnel are respectively IP addresses of the ABS and the ARS. Wherein, the data transmission is performed between the ASN GW and the ABS through a wired bearer, and the data transmission is performed between the ABS and the ARS through a radio bearer. There is a mapping relationship between two sections of tunnels, and this mapping information is stored in the ABS. After GRE tunnels are established, the AMS service flow connections are bore on the GRE tunnels, and different service flow connections correspond to different GRE keys (that is, correspond to different tunnels).

Step 2: After the ASN GW receives an IP packet from an external node (for example, other ASN GW or core network), the sorter performs GRE encapsulation for data of AMSs subordinate to the ABS and data of the AMSs subordinate to ARSs governed by the ABS according to a certain principle, for example, the IP address of the destination, and sends the data to the ABS through the wired bearer between the ASN GW and the ABS.

Step 3: After receiving the data, the ABS reads the GRE key in the GRE encapsulated header, re-encapsulates the load in the received GRE encapsulated packet with the GRE key of the GRE tunnel between the ABS and the ARS according to the stored mapping relationship between the two sections of GRE tunnels, processes the packet, and maps the packet to the corresponding air interface relay connection to send the packet to the ARS in relay MAC PDU format.

During the downlink data transmission, to guarantee the end-to-end QoS, it is necessary to associate the radio link bearer and the wired link bearer. In details, this operation comprises: in a radio relay network defined by IEEE802.16m, plural unidirectional air interface service flows with different QoS classes for data transmission are established between the ARS and the ABS. In Step 3, when the ABS maps the GRE encapsulated packet to the air interface service flow, it maps GRE packets with different QoS classes to different service flows through the DSCP field in the GRE encapsulated header to send the packets to the ARS. Wherein, the QoS class of the service flow between the ARS and the ABS may have a one-to-one correspondence for the value of the DSCP field in the GRE packet, and also may have a one-to-several or several-to-one correspondence for the value of the DSCP field in the GRE packet.

Embodiment 2

The downlink data transmission method will be specifically described below with reference to FIG. 6.

Step 1: The ASN GW establishes a GRE tunnel between the ASN GW and the ABS; the ABS establishes a GRE tunnel between the ABS and the ARS. Wherein, each service flow connection of the AMS respectively has a one-to-one mapping relationship with the GRE key of two sections of GRE tunnels. The mapping relationship between the two sections of GRE tunnels is stored in the ABS.

In addition, one or more relay service flow connections for data transmission are established between the ABS and the ARS, and mapping relationships are established between service flows of AMSs and relay service flow connections according to the QoS class parameter. In addition, the DSCP values of the GRE/IP encapsulation between the ABS and the ARS also have mapping relationships with the relay service flows according to the QoS class parameter. Thereby, it may be known that the AMSs service flows, relay service flows between the ABS and the ARS, and GRE/IP encapsulations between the ABS and the ARS have mapping relationships according to the QoS class parameter.

Step 2: After receiving the IP packet, the ASN GW analyzes the destination IP address in the IP header to obtain the information of the destination AMS, then maps the IP packet to the corresponding GRE tunnel, sets a GRE key and a DSCP value for the IP packet, and encapsulates the IP packet into a GRE/IP encapsulated packet. The ASN GW sends the GRE/IP encapsulated packet to the ABS through the wired bearer on the GRE tunnel.

Step 3: After receiving the GRE/IP encapsulated packet, the ABS analyzes the GRE key thereof, re-encapsulates the GRE/IP encapsulated packet with the GRE key between the ABS and the ARS according to the stored one-to-one mapping relationship between the two sections of GRE tunnels, and maps the GRE/IP encapsulated packet to the corresponding relay service flow between the ABS and the ARS according to the DSCP value of the packet. To reduce the resource overload of the radio air interface link, the ABS compresses the header of the GRE/IP encapsulated packet, encapsulates the compressed GRE/IP encapsulated packet as payload into a relay MAC PDU, and sends the relay MAC PDU to the ARS in the relay service flow.

Step 4: After receiving the relay MAC PDU sent by the ABS, the ARS decompresses the header of the GRE/IP encapsulated packet, analyzes the GRE/IP header to obtain the GRE key, and obtains the information of the AMS service flow connection corresponding to the encapsulated packet through the GRE key. The ARS decapsulates the GRE/IP, re-encapsulates the payload (SDU) in the MAC PDU format defined in IEEE802.16m, and sends the MAC PDU to the AMS in the AMS air interface service flow connection.

Embodiment 3

For uplink data transmission, the basic flow thereof is similar to that of downlink data transmission, the detailed flow comprises:

Step 1: The RS establishes a GRE tunnel between the RS and the BS, and the BS establishes a GRE tunnel between the BS and the ASN GW. Wherein, the two sections of tunnels have a one-to-one mapping relationship, and this mapping relationship is stored in the BS. After GRE tunnels are established, the service flows of the MS are bore on the GRE tunnels when transmitted between the RS and the BS and between the BS and the ASN GW, and different service flows correspond to different GRE keys.

Step 2: After receiving the data from the MS, the RS maps the service flow of the MS to the GRE tunnel, that is, it performs GRE/IP encapsulation and header compression for the payload in MAC PDU, encapsulates the payload into a relay MAC PDU, and sends the relay MAC PDU to the BS in the relay air interface link service flow connection between the RS and the BS. Wherein, the service flows of the MS have a several-to-one or one-to-one mapping relationship with the relay air interface link service flows between the RS and the BS. In other words, the service flows of the MS, the GRE tunnels and the relay air interface link service flows have a certain mapping relationship.

Step 3: After receiving the relay MAC PDU, the BS analyzes the relay MAC header of the relay MAC PDU to obtain the GRE/IP encapsulated packet in the load, and analyzes the GRE header to obtain the information of the GRE key; the BS re-encapsulates the received GRE/IP encapsulated packet into a GRE/IP encapsulated packet corresponding to the GRE tunnel between the BS and the ASN GW according to the stored mapping relationship of the two sections of GRE tunnels; the BS sends the re-encapsulated GRE/IP encapsulated packet to the ASN GW.

Embodiment 4

The relay network may be extended to multi-hop relay, that is, the MS accesses the BS through a plurality of (more than one) RSs. The implementation method of multi-hop relay is similar to that of two-hop relay, the GRE tunnel is still hop by hop relay. That is, the source IP and destination IP addresses in the GRE/IP encapsulated header should be the addresses of two end nodes in each hop relay. Wherein, each intermediate node is stored with the mapping relationship between the GRE tunnel which is between the intermediate node and the parent node and the GRE tunnel which is between the intermediate node and the child node.

In terms of air interface link transmission, there are two data transmission methods between the BS/intermediate RS and the destination RS.

Method 1: The ABS uses the STID of the destination ARS to address; the intermediate ARS knows that the destination ARS is a subordinate ARS from the path information, and forwards the received GRE/IP packet processed with header compression.

Method 2: The ABS establishes an end-to-end air interface tunnel between the ABS and the destination ARS and the tunnel information contains the end-to-end routing information. The intermediate ARS forwards the GRE/IP packet processed with header compression according to the routing information of the air interface tunnel. After the GRE/IP packet processed with header compression reaches the destination ARS, the ARS decompresses the header, maps the payload to the corresponding AMS service flow connection to send the payload to the AMS in MAC PDU format.

Embodiment 5

During the uplink and downlink data plane transmission, to save the resource overload of the air interface link between the ARS and the ABS, it is necessary to perform header compression for the GRE/IP encapsulated header. The compression method comprises:

Method 1: Considering the payload protocol type of both the IP encapsulated part and the GRE encapsulated part in the GRE/IP encapsulated header is static parameter, payload protocol type may be completely compressed according to the compression protocol; while, the two fields of both GRE key and sequence number in the GRE encapsulated part are dynamic parameters, according to the different function, GRE key needs to be completely reserved, 4 bytes of sequence number field may be compressed to a short byte, for example, one byte.

Method 2: A compression protocol, for example, ROHC, which is adapted to dynamic parameter compression, is used to compress the GRE/IP encapsulated header. After compression, the static parameter is completely compressed, the GRE key is reserved, and sequence number may be compressed to 2 to 4 bits. However, the compression method needs response of the ACK channel.

Method 3: In consideration that the IP header part in the GRE/IP encapsulated header has no essential function in the air interface link between the ABS and the ARS, the IP header part may be abandoned, and the GRE header part is compressed. Wherein, Method 1 or Method 2 may still be used for the compression of the GRE header part.

Figure 8:
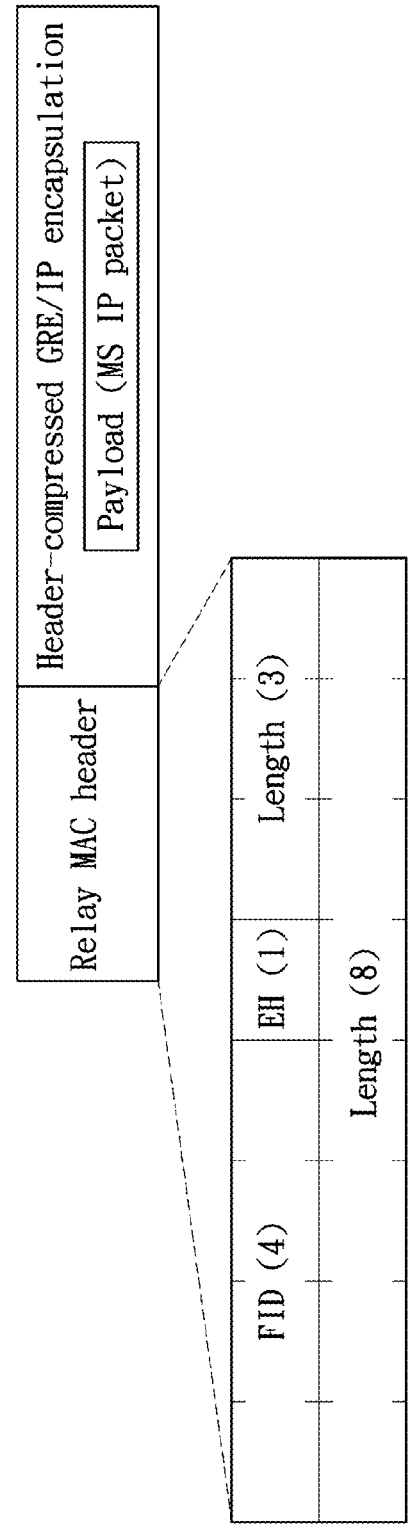
FIG. 8 is a relay MAC PDU encapsulation format for data transmission between the ARS and the ABS according to embodiments of the disclosure.

To complete the data transmission in the data plane, FIG. 8 illustrates a relay MAC PDU encapsulation format for data transmission between the ARS and the ABS according to embodiments of the disclosure, data transmission is performed in the format as shown in FIG. 8.

Embodiment 6

Figure 9:
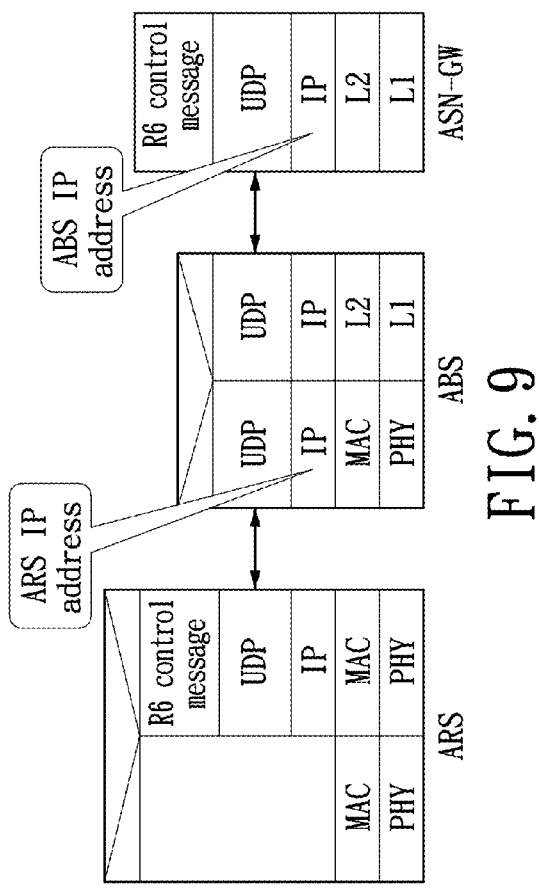
FIG. 9 is a diagram of a control plane protocol stack architecture of a Layer3 RS according to embodiments of the disclosure.

On the control plane, the signaling transmission method is similar to the data transmission method. FIG. 9 is a diagram of a control plane protocol stack architecture of a Layer3 RS according to embodiments of the disclosure. The signaling transmission method comprises:

Step 1: Two sections of UDP/IP tunnels for signaling transmission are established, the two endpoints of one of the two sections of tunnels are respectively the ASN GW and the BS, and the two endpoints of the other one of the two sections of tunnels are respectively the BS and the RS. The mapping relationship of the two sections of UDP/IP tunnels is stored in the BS.

Step 2: Based on whether the signaling to be transmitted is downlink signaling or uplink signaling, the following Step 2-1 or Step 2-2 is included:

Step 2-1: During downlink signaling transmission, the BS analyzes the UDP/IP encapsulated header to obtain the information of the UDP/IP tunnel, and re-encapsulates the load into a UDP/IP packet according to the stored correspondence between the two sections of tunnels; the BS compresses the header of the re-encapsulated UDP/IP packet, and sends the UDP/IP packet to the RS in relay MAC PDU format in the air interface management connection.

Step 2-2: During uplink signaling transmission, the RS performs UDP/IP encapsulation for the R6 message, compresses the header of the packet, and sends the packet to the BS in relay MAC PDU format in the air interface management connection; after receiving the packet, the BS analyzes the UDP/IP encapsulated header to obtain the information of the UDP/IP tunnel; the BS re-encapsulates the payload into a UDP/IP packet according to the stored correspondence between the two sections of tunnels; the BS compresses the header of the re-encapsulated UDP/IP packet and sends the UDP/IP packet to the ASN GW.

Figure 10:
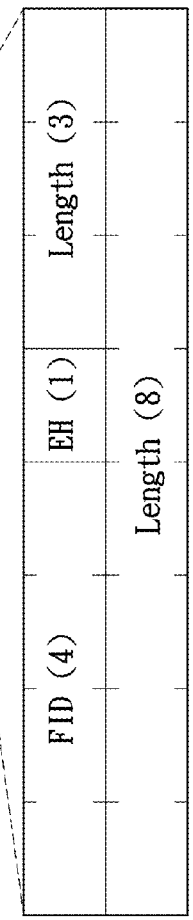
FIG. 10 is a diagram of a relay MAC PDU encapsulation format for signaling transmission between the ARS and the ABS according to embodiments of the disclosure.

To complete the message transmission in the control plane, FIG. 10 is a diagram of a relay MAC PDU encapsulation format for signaling transmission between the ARS and the ABS according to embodiments of the disclosure, signaling transmission is performed according to the format as shown in FIG. 10.

Figure 11:
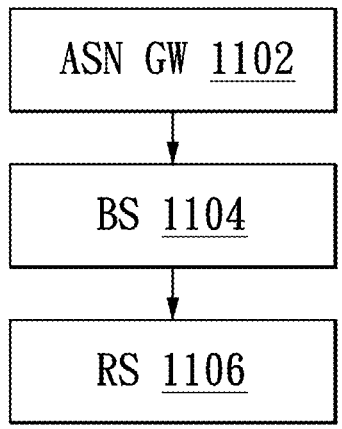
FIG. 11 is a structure block diagram of a system for transmitting information in a relay communication network according to embodiments of the disclosure.

According to the embodiments of the disclosure, a system for transmitting information in a relay communication network is provided; FIG. 11 is a structure block diagram of a system for transmitting information in a relay communication network according to the embodiments of the disclosure, as shown in FIG. 11, the system comprises:

an ASN GW 1102, configured to establish a first tunnel and send signaling and/or data to a BS 1104 through the first tunnel, wherein the first tunnel is a tunnel between the ASN GW 1102 and the BS 1104;

the BS 1104, connected with the ASN GW 1102 and configured to establish a second tunnel and send the signaling and/or data to the RS 1106 through the second tunnel, wherein the second tunnel is a tunnel between the BS 1104 and the RS 1106;

the RS 1106, connected with the BS 1104, and configured to receive the signaling and/or data from the BS 1104 through the second tunnel.

According to the embodiments of the disclosure, a system for transmitting information in a relay communication network is provided; FIG. 11 is a structure block diagram of a system for transmitting information in a relay communication network according to the embodiments of the disclosure, as shown in FIG. 11, the system comprises:

a RS 1106, configured to establish a second tunnel and send signaling and/or data to a BS 1104 through the second tunnel, wherein the second tunnel is a tunnel between the BS 1104 and the RS 1106;

the BS 1104, connected with the RS 1106, and configured to establish a first tunnel and send the signaling and/or data to an ASN GW 1102 through the first tunnel, wherein the first tunnel is a tunnel between the ASN GW 1102 and the BS 1104;

the ASN GW 1102, connected with the BS 1104, and configured to receive the signaling and/or data from the BS 1104 through the first tunnel.

It should be noted that, the system is used for implementing the foregoing information transmission method in a relay communication network, and the specific implementation method thereof has been described in details in embodiments of method and will not be described repeatedly herein.

In conclusion, through the method provided by the instant disclosure, by establishing tunnels between the ASN GW and the BS and between the BS and the RS, data and/or signaling transmission is implemented, the problem that Layer3 relay cannot be implemented in the related technologies is solved, Layer3 relay is further implemented.

Obviously, persons skilled in the field should understand that the above modules or steps of the disclosure could be achieved through general calculating devices, they can be concentrated in a single calculating device or distributed in a network formed by multiple calculating devices. Optionally, they can be achieved by program codes that can be executed by calculating devices, thus, they can be stored in storage devices to be executed by calculating devices, and under certain situation, the shown or described steps can be executed according to an order different from the above order, or they can be achieved by respectively making them into many integrated circuit modules or by making multiple modules or steps among them into a single integrated circuit module. In this way, the disclosure is not limited to combinations of any specific hardware and software.

Above contents are only preferred embodiments of the disclosure and are not used for limiting the disclosure. For persons skilled in the field, the disclosure may have various alternations and changes. Any modifications, equivalent replacements and improvements within the spirit and principle of the disclosure should be contained within the protection scope of the disclosure.

What is claimed is:

1. A method for transmitting information in a relay communication network, comprising:

establishing a first tunnel and a second tunnel, wherein the first tunnel is a tunnel between an Access Service Network Gateway (ASN GW) and a Base Station (BS), the second tunnel is a tunnel between the BS and a Relay Station (RS);

performing signaling and/or data transmission between the ASN GW and the RS through the first tunnel and the second tunnel;

wherein the step of performing signaling and/or data transmission between the ASN GW and the RS through the first tunnel and the second tunnel comprises: in a case that the transmission is a downlink transmission, the ASN GW sending downlink signaling and/or data to the BS through the first tunnel, and the BS forwarding the downlink signaling and/or data to the RS through the second tunnel according to a mapping relationship; wherein, the mapping relationship is the mapping relationship between the first tunnel and the second tunnel;

wherein in a case of downlink data transmission, the step of performing data transmission between the ASN GW and the RS through the first tunnel and the second tunnel comprises: the ASN GW encapsulating the downlink data into a first GRE/IP encapsulated packet and sending the first GRE/IP encapsulated packet to the BS through the first tunnel; the BS identifying information of the second tunnel according to the mapping relationship and the information of the first tunnel obtained by analyzing the first GRE/IP encapsulated packet, re-encapsulating payload into a second GRE/IP encapsulated packet, further encapsulating the second GRE/IP encapsulated packet into a relay MAC PDU, and sending the relay MAC PDU to the RS;

wherein in a case of downlink data transmission, before encapsulating the second GRE/IP encapsulated packet into a relay MAC PDU and sending the relay MAC PDU to the RS, the method further comprises: the BS determining whether the destination MS of the downlink data is a MS governed by the BS or a MS under a RS governed by the BS, encapsulating the downlink data into a MAC PDU and sending the MAC PDU to the destination MS if the destination MS is a MS governed by the BS, and continuing the subsequent processing if the destination MS is a MS under a RS governed by the BS.

2. The method according to claim 1, wherein the step of performing signaling and/or data transmission between the ASN GW and the RS through the first tunnel and the second tunnel comprises:

in a case that the transmission is an uplink transmission, the RS sending uplink signaling and/or data to the BS through the second tunnel, and the BS forwarding the uplink signaling and/or data to the ASN GW through the first tunnel according to the mapping relationship.

3. The method according to claim 2, wherein, in a case that the transmission is a data transmission, the first tunnel and the second tunnel are Generic Routing Encapsulation (GRE) tunnels.

4. The method according to claim 3, wherein,
in a case of uplink data transmission, the step of performing data transmission between the ASN GW and the RS through the first tunnel and the second tunnel comprises:
the RS encapsulating the uplink data into a second GRE/IP encapsulated packet, further encapsulating the second GRE/IP encapsulated packet into a relay Media Access Control Protocol Data Unit (relay MAC PDU) and sending the relay MAC PDU to the BS;
the BS analyzing the relay MAC PDU to obtain the second GRE/IP encapsulated packet, identifying information of the first tunnel according to the mapping relationship and the information of the second tunnel obtained by analyzing the second GRE/IP encapsulated packet, re-encapsulating payload into a first GRE/IP encapsulated packet and sending the first GRE/IP encapsulated packet to the ASN GW through the first tunnell.

5. The method according to claim 4, wherein one of the RS and the BS maps the relay MAC PDU to an air interface connection service flow with corresponding quality of service (QoS) class to send the relay MAC PDU to the other one, after re-encapsulating the second GRE/IP encapsulated packet into the relay MAC PDU.

6. The method according to claim 4, wherein the information of the first tunnel and the information of the second tunnel include a GRE key.

7. The method according to claim 4, wherein the GRE/IP encapsulated packets are encapsulated packets processed by compression, wherein the compression includes header compression, and the header compression includes one of the following ways:
completely compressing static parameters according to a compression protocol, reserving the GRE key of a GRE part, and compressing the bytes used by a sequence number field;
using a compression protocol adapted to dynamic parameter compression to compress a GRE/IP encapsulated header;
abandoning the IP header in a GRE/IP encapsulated header, and compressing the GRE header in a GRE/IP encapsulated header.

8. The method according to claim 2, wherein, in a case that the transmission is a signaling transmission, the first tunnel and the second tunnel are User Datagram Protocol (UDP)/IP tunnels.

9. The method according to claim 8, wherein,
in a case of uplink signaling transmission, the step of performing signaling transmission between the ASN GW and the RS through the first tunnel and the second tunnel comprises:
the RS encapsulating the uplink signaling into a second UDP/IP encapsulated packet, further encapsulating the second UDP/IP encapsulated packet into a relay MAC PDU and sending the relay MAC PDU to the BS;
the BS analyzing the relay MAC PDU to obtain the second UDP/IP encapsulated packet, identifying the information of the first tunnel according to the mapping relationship and the information of the second tunnel obtained by analyzing the second UDP/IP encapsulated packet, re-encapsulating payload into a first UDP/IP encapsulated packet and sending the first UDP/IP encapsulated packet to the ASN GW through the first tunnel;
in a case of downlink signaling transmission, the step of performing signaling transmission between the ASN GW and the RS through the first tunnel and the second tunnel comprises:
the ASN GW encapsulating the downlink signaling into a first UDP/IP encapsulated packet and sending the first UDP/IP encapsulated packet to the BS through the first tunnel;
the BS identifying the information of the second tunnel according to the mapping relationship and the information of the first tunnel obtained by analyzing the first UDP/IP encapsulated packet, re-encapsulating payload into a second UDP/IP encapsulated packet, further encapsulating the second UDP/IP encapsulated packet into a relay MAC PDU, and sending the relay MAC PDU to the RS.

10. The method according to claim 9, wherein, in a case of downlink signaling transmission, after encapsulating the second UDP/IP encapsulated packet into a relay MAC PDU and sending the relay MAC PDU to the RS, the method further comprises:
the RS analyzing the relay MAC PDU to obtain the second UDP/IP encapsulated packet, analyzing the second UDP/IP encapsulated packet to obtain the downlink signaling, generating the downlink signaling in an air interface side message format, encapsulating the downlink signaling in the air interface side message format into a MAC PDU, and sending the MAC PDU to a MS.

11. The method according to claim 9, wherein one of the RS and the BS maps the relay MAC PDU to an air interface connection service flow with corresponding quality of service (QoS) class to send the relay MAC PDU to the other one, after re-encapsulating the second UDP/IP encapsulated packet into the relay MAC PDU.

12. The method according to claim 9, wherein the UDP/IP encapsulated packets are encapsulated packets processed by compression, wherein the compression includes header compression.

13. The method according to claim 1, wherein, in a case of downlink data transmission, after encapsulating the second GRE/IP encapsulated packet into a relay MAC PDU and sending the relay MAC PDU to the RS, the method further comprises:
the RS analyzing the relay MAC PDU to obtain the second GRE/IP encapsulated packet, analyzing the second GRE/IP encapsulated packet to obtain the downlink data, encapsulating the downlink data into a MAC PDU, and sending the MAC PDU to a Mobile Station (MS).

14. The method according to claim 1, wherein,
in a case of downlink data transmission, the step of establishing the first tunnel and the second tunnel comprises: the ASN GW establishing the first tunnel, and the BS establishing the second tunnel;
in a case of uplink data transmission, the step of establishing the first tunnel and the second tunnel comprises: the BS establishing the first tunnel, and the RS establishing the second tunnel.

15. The method according to claim 1, wherein the second tunnel is a multi-section tunnel from the BS to the RS through one or more intermediate RSs.

16. The method according to claim 15, wherein the step of performing signaling and/or data transmission between the ASN GW and the RS through the first tunnel and the second tunnel comprises:
performing signaling and/or data transmission between the ASN GW and the BS through the first tunnel;

according to the mapping relationship between adjacent tunnels in the multi-section tunnel, performing signaling and/or data transmission from the BS to the RS via one or more intermediate RSs through the second tunnel.

17. The method according to claim 15, wherein the step of performing downlink signaling and/or data transmission between the ASN GW and the RS through the first tunnel and the second tunnel comprises:
the ASN GW sending downlink signaling and/or data to the BS through the first tunnel;
the BS addressing according to a Station Identifier (STID) of the RS, and the intermediate RS forwarding the downlink signaling and/or data in a case of determining that the RS is a subordinate RS of the intermediate RS according to the STID, until the downlink signaling and/or data reaches the RS.

18. A method for transmitting information in a relay communication network, comprising:
establishing a first tunnel, wherein the first tunnel is a tunnel between an ASN GW and a BS;
performing signaling transmission between the ASN GW and the BS through the first tunnel, and performing signaling transmission between the BS and a RS through an air interface;
wherein in a case of uplink signaling transmission, the step of performing signaling transmission between the BS and a RS through an air interface comprises: the RS bearing the uplink signaling in an air interface side message and sending the air interface side message to the BS, wherein the uplink signaling includes one of the following messages: R6 interface message generated from a signaling message from a MS, and R6 interface message generated by the RS; the step of performing signaling transmission between the ASN GW and the BS through the first tunnel comprises: the BS encapsulating the uplink signaling analyzed from the air interface side message into a UDP/IP encapsulated packet and sending the UDP/IP encapsulated packet to the ASN GW; in a case of downlink signaling transmission, the step of performing signaling transmission between the ASN GW and the BS through the first tunnel comprises: the ASN GW encapsulating the downlink signaling into a UDP/IP encapsulated packet and sending the UDP/IP encapsulated packet to the BS through the first tunnel; the step of performing signaling transmission between the BS and a RS through an air interface comprises: the BS analyzing the UDP/IP encapsulated packet to obtain the downlink signaling, bearing payload in an air interface side message, and sending the air interface side message to the RS.

19. The method according to claim 18, wherein one of the RS and the BS maps the air interface side message to an air interface connection service flow with corresponding quality of service (QoS) class to send the air interface side message to the other one.

20. The method according to claim 18, wherein the signaling transmission is performed between the BS and the RS via one or more intermediate RSs through the air interface.

21. A system for transmitting information in a relay communication network, comprising:
an ASN GW, configured to establish a first tunnel and send signaling and/or data to a BS through the first tunnel, wherein the first tunnel is a tunnel between the ASN GW and the BS;
the BS, configured to establish a second tunnel and send the signaling and/or data to the RS through the second tunnel, wherein the second tunnel is a tunnel between the BS and the RS;
the RS, configured to receive the signaling and/or data from the BS through the second tunnel
wherein the ASN GW is further configured to send downlink signaling and/or data to the BS through the first tunnel in a case that the transmission is a downlink transmission, and the BS is further configured to forward the downlink signaling and/or data to the RS through the second tunnel according to a mapping relationship; wherein, the mapping relationship is the mapping relationship between the first tunnel and the second tunnel;
wherein the ASN GW is further configured to encapsulate the downlink data into a first GRE/IP encapsulated packet and send the first GRE/IP encapsulated packet to the BS through the first tunnel; the BS is further configured to identify information of the second tunnel according to the mapping relationship and the information of the first tunnel obtained by analyzing the first GRE/IP encapsulated packet, re-encapsulate payload into a second GRE/IP encapsulated packet, further encapsulate the second GRE/IP encapsulated packet into a relay MAC PDU, and send the relay MAC PDU to the RS;
wherein, the BS is further configured to determine whether the destination MS of the downlink data is a MS governed by the BS or a MS under a RS governed by the BS, encapsulate the downlink data into a MAC PDU and send the MAC PDU to the destination MS if the destination MS is a MS governed by the BS, and continue the subsequent processing if the destination MS is a MS under a RS governed by the BS.

22. A system for transmitting information in a relay communication network, comprising:
a RS, configured to establish a second tunnel and send signaling and/or data to a BS through the second tunnel, wherein the second tunnel is a tunnel between the BS and the RS;
the BS, configured to establish a first tunnel and send the signaling and/or data to an ASN GW through the first tunnel, wherein the first tunnel is a tunnel between the ASN GW and the BS;
the ASN GW, configured to receive the signaling and/or data from the BS through the first tunnel;
wherein the ASN GW is further configured to send downlink signaling and/or data to the BS through the first tunnel in a case that the transmission is a downlink transmission, and the BS is further configured to forward the downlink signaling and/or data to the RS through the second tunnel according to a mapping relationship; wherein, the mapping relationship is the mapping relationship between the first tunnel and the second tunnel;
wherein the ASN GW is further configured to encapsulate the downlink data into a first GRE/IP encapsulated packet and send the first GRE/IP encapsulated packet to the BS through the first tunnel; the BS is further configured to identify information of the second tunnel according to the mapping relationship and the information of the first tunnel obtained by analyzing the first GRE/IP encapsulated packet, re-encapsulate payload into a second GRE/IP encapsulated packet, further encapsulate the second GRE/IP encapsulated packet into a relay MAC PDU, and send the relay MAC PDU to the RS;
wherein, the BS is further configured to determine whether the destination MS of the downlink data is a MS governed by the BS or a MS under a RS governed by the BS, encapsulate the downlink data into a MAC PDU and send the MAC PDU to the destination MS if the destination MS is a MS governed by the BS, and continue the subsequent processing if the destination MS is a MS under a RS governed by the BS.

\* \* \* \* \*